United States Patent [19]

Mizuno et al.

[11] 4,386,947
[45] Jun. 7, 1983

[54] APPARATUS FOR ADSORBING FUEL VAPOR

[75] Inventors: Junzi Mizuno; Akira Fukami; Kunio Okamoto, all of Okazaki; KenIchi Hanaki, Aichi, all of Japan

[73] Assignee: Nippon Soken, Inc., Nishio, Japan

[21] Appl. No.: 256,664

[22] Filed: Apr. 22, 1981

[30] Foreign Application Priority Data

Apr. 25, 1980 [JP] Japan .................................. 55-55865
May 28, 1980 [JP] Japan .................................. 55-71945
May 29, 1980 [JP] Japan .................................. 55-72277
Jun. 13, 1980 [JP] Japan .................................. 55-80507

[51] Int. Cl.³ .............................................. B01D 53/04
[52] U.S. Cl. ........................................ 55/387; 55/316;
55/DIG. 42; 123/519; 422/180
[58] Field of Search .......... 55/316, 387, 528, DIG. 42;
123/518-521; 252/421, 444, 477 R; 422/171, 180

[56] References Cited

U.S. PATENT DOCUMENTS

| 3,477,210 | 11/1969 | Hervert | 123/519 X |
| 3,683,597 | 8/1972 | Beveridge et al. | 123/519 |
| 3,721,072 | 3/1973 | Clapham | 55/387 |
| 3,727,597 | 4/1973 | Hensler | 123/519 |
| 3,785,781 | 1/1974 | Hervert et al. | 422/171 |
| 3,831,353 | 8/1974 | Toth | 55/387 |
| 3,983,283 | 9/1976 | Bagley | 422/180 X |
| 4,027,476 | 6/1977 | Schmidt | 422/180 X |

Primary Examiner—Robert H. Spitzer
Attorney, Agent, or Firm—Cushman, Darby & Cushman

[57] ABSTRACT

An apparatus for adsorbing fuel vapor having a fuel vapor inlet communicating to a fuel tank, a mixed gas outlet communicating to the intake passage of an internal combustion engine, a desorbent air inlet communicating to the atmospheric air and an adsorbent for adsorbing the fuel vapor introduced from the fuel tank. The adsorbent includes an integrally formed activated carbon having a monolithic honeycomb structure having many through passages.

10 Claims, 46 Drawing Figures

APPARATUS FOR ADSORBING FUEL VAPOR

This invention relates to an apparatus for adsorbing fuel vapor used in automobiles, motorcycles and the like, and more particularly to an adsorbent used for such apparatus.

In the hitherto known apparatuses for preventing the vaporization of fuel for use in, for example, automobiles or motorcycles, a granulated activated carbon packed into a container is used as adsorbent.

This is for the following reasons:

(1) Activated carbon can be mass-produced today and it is most surely established used as adsorbent.

(2) Activated carbon has a high degree of freedom with regard to the shape of container in the apparatus.

(3) Activated carbon can retain an appropriate resistance to gas flow, depending on the extent of packing in the container.

(4) Since the passages of gas flow has a complicated and intricated form, the flow of the gas in the activated carbon packed becomes a turbulent flow which promotes the actions of adsorption and desorption.

However, activated carbon has various faults on the other hand because the direction of fuel vapor flow is arbitrary and undetermined.

Hereunder, the prior technique and this invention will be explained with reference to drawings.

BRIEF DESCRIPTION OF THE DRAWINGS

FIGS. 14a to 14d are plan views of the laminated body of FIG. 12 and the first, second and third monolithic structures constructing the laminated product, wherein FIG. 14a is a plan view of the laminated product.

FIGS. 16a to 16c illustrate another example of this invention, wherein

FIGS. 17a and 17b illustrate another example of this invention, wherein FIG. 17a is a front sectional view and FIG. 17b is an b—b sectional view of FIG. 17a.

FIGS. 18a to 18d illustrate the laminated product used in the examples of FIGS. 9a and 9b and the first, second and third monolithic structures, wherein

FIG. 33b is x—x sectional view of FIG. 33a.

FIGS. 34a to 34c illustrate yet another example of the apparatus of this invention, wherein

Figure 1:
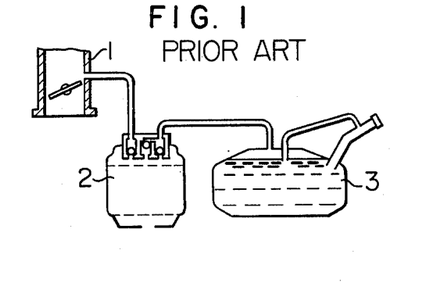
FIG. 1 is a system diagram for explaining the prior technique and this invention.

In this type of hitherto known apparatuses, as shown in FIG. 1 for example, the fuel vapor generated in fuel tank 3 or the like is led into container 2 where it is adsorbed onto activated carbon layer. Further, when the engine satisfies a predetermined condition in the running car, air is introduced from the desorbent air inlet hole into container 2 by utilizing the negative pressure of the engine, by which the fuel vapor adsorbed on activated carbon layer is desorbed, led into combustion chamber through admission pipe 1 of the engine as a mixed gas and burned there.

Since the above-mentioned fuel vaporization preventing apparatus is directly attached to the car body, it is always undergoing vibration when the car is running. Further, when the car is running on a bad road or the like, it undergoes a very strong vibration.

Figure 2:
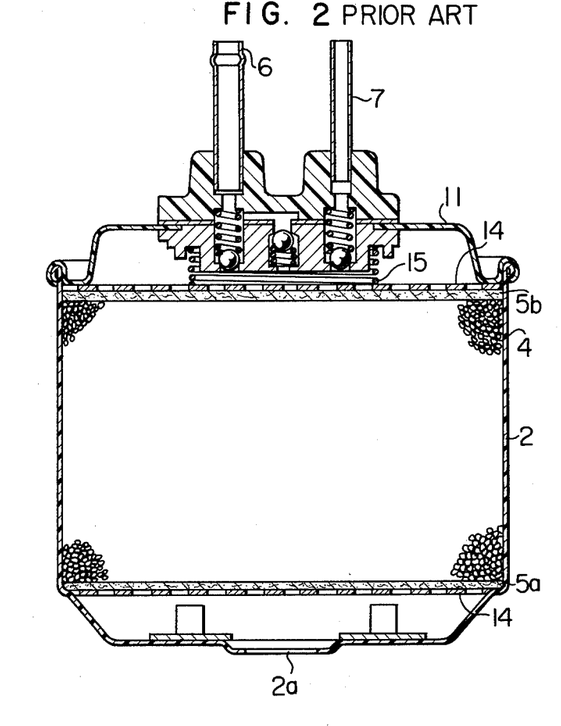
FIG. 2 is a sectional view illustrating the hitherto known apparatus.

Now, the granulated activated carbon in the fuel vaporization preventing apparatus of FIG. 1 is merely packed into container 2, as shown in FIG. 2. Therefore, the particles rub one another locally, the particle surfaces are worn away, and they are pulverized. If once the pulverization begins, the volume of granulated activated carbon 4 in container 2 decreases so that the chance of mutual rubbing between granulated activated carbon 4 increases and the pulverization takes place with acceleration.

As the result, the filters 5a and 5b stopping the up and down sides of activated carbon layer 4 are clogged to increase the resistance to gas flow and to decrease the desorbing action in activated carbon layer 4. The fine powder formed by pulverization is led to the combustion chamber of engine via filter 5b to excercise an undesirable effect on the engine. Further, the adsorbing area of granulated activated carbon 4 itself rapidly decreases, until the function as an apparatus for preventing the vaporization of fuel vapor is lost, which is a fatal disadvantage.

Further, since the activated carbon is granular, many parts such as plate 14, spring 15 and so on are necessary for holding it in container 2, which is harmful for lightening the weight of this sort of apparatuses.

Further, since the adsorbent is granular, the fuel vapor and the desorbent air do not flow uniformly in the packed activated carbon layer but can sometimes flow one-sidedly, when the activated carbon as an adsorbent is not utilized fully effectively.

Figures 24, 25, 26, 27:
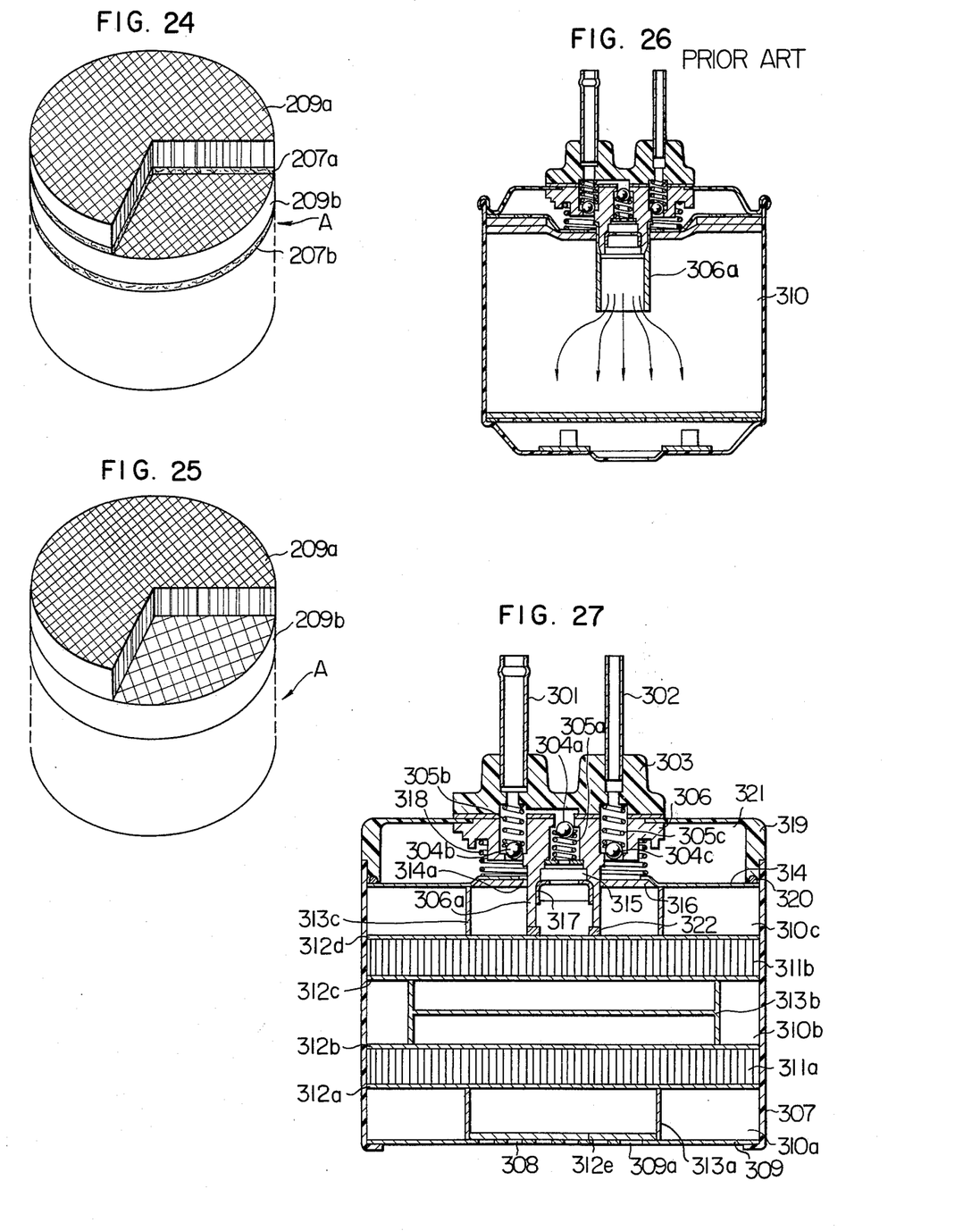
FIGS. 24 and 25 are partial sectional perspective views illustrating the laminated products in other examples of this invention.
FIG. 26 is a sectional view illustrating the hitherto known apparatus.
FIG. 27 is a sectional view illustrating one example of the apparatus of this invention.

Further, FIG. 26 is a sectional view illustrating one example of the hitherto known fuel vaporization preventing apparatus for automobiles, wherein a granulated activated carbon layer is used as adsorbent. In this case, the pipe 306d extending into the activated carbon layer leads the fuel vapor forcibly into the activated carbon layer in order to prevent the short cut phenomenon, i.e. the phenomenon that, in the course of working an internal combustion engine, the fuel vapor flowing in does not pass the activated carbon layer but is directly led from the mixed gas outlet tube into the admission part of the internal combustion engine.

As indicated by the arrow marks of FIG. 26, however, the fuel vapor led via pipe 306a into activated carbon layer almost exclusively flows towards the under layer of the granulated activated carbon layer 310 and only a slight quantity spreads to the upper layers higher than the outlet of pipe 306a as a weak diffusion flow.

Accordingly, it is understandable that the fuel vapor cannot easily be adsorbed to the layers higher than the outlet of pipe 306a among the layers of activated carbon 310, and that the fuel vapor cannot sufficiently be spread to corners in the layers lower than the outlet 306a among the layers of activated carbon because the transverse sectional area of pipe 306a is generally considerably smaller than the transverse sectional area of activated carbon layer 310, and accordingly that the whole activated carbon layer 310 is not utilized effectively.

In order to overcome the above-mentioned faults, the present inventors have conducted extensive studies to provide an apparatus for adsorbing fuel vapor wherein an integrally formed activated carbon having a monolithic structure having many passages (hereinafter, referred to as "monolithic activated carbon") is used as adsorbent by which the pulverization of activated carbon adsorbent layer can be prevented, the whole adsorbent layer can be utilized effectively, the structure of the apparatus can be made simple and light-weight, the adsorbent can be formed into a package and it becomes possible to replace only the adsorbent.

It is an object of this invention to provide an integrally formed activated carbon having a monolithic structure as an adsorbent used in an apparatus for adsorbing fuel vapor.

It is another object of this invention to provide an apparatus for adsorbing fuel vapor in which an integrally formed activated carbon having a monolithic structure is used as an adsorbent for fuel vapor.

Hereunder, this invention will be explained with reference to the following examples.

EXAMPLE 1

The activated carbon of this invention, having a monolithic structure, can be obtained according to the following production process.

100 Grams of methyl cellulose was added to 1 kg of powder of coal origin activated carbon having a size of 200 mesh and the mixture was thoroughly homogenized to give starting material. A part from it, 950 milliliters of water was mixed with 500 grams of a water-soluble varnish containing 40% of a water-soluble imide resin (the residual 60% was water) to give a fluid. The fluid was slowly added to said starting material 1 and thoroughly mixed together in a kneader and then thoroughly kneaded by means of a kneading machine to give a kneaded material. Then the kneaded material was introduced into an extruder to which a mold for forming a monolithic honeycomb structure had been attached and the kneaded material was extruded out of the monolithic forming mold, whereby a monolithic-like activated carbon body or structure was formed. Then, the monolithic-like activated carbon structure thus obtained was dried at 60° C. for 8 hours, heated to 120° C. at a temperature-raising speed of 12° C./hr and kept at 120° C. for 5 hours to dry it sufficiently. Finally, this monolithic activated carbon structure was heated at 270° C. for 2 hours in an atmosphere of nitogen, whereby a sufficiently thermally hardened monolithic activated carbon structure was obtained.

Figure 4:
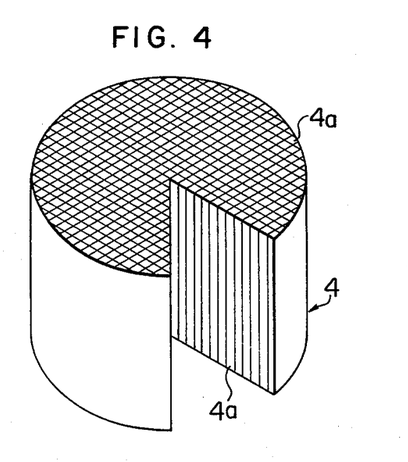
FIG. 4 is a perspective view illustrating the foamed activated carbon used in FIG. 3.

The activated carbon of the monolithic structure is so constructed that individual passages for gas communicate from the one end surface to the other end surface while being mutually isolated via partition walls, as shown in FIG. 4. Therefore, when it is used as an adsorbent, the phenomenon of "flow through" easily appears because of the shortness of the passages, so that there is a great danger that all the fuel vapor generated in the fuel tank or the like of the one car cannot be recovered but some is released into the atmosphere in spite of the adequate adsorbing ability of the activated carbon of the monolithic honeycomb structure itself.

Further, when activated carbon of monolithic honeycomb structure is used without modification, a phenomenon may take place wherein the fuel vapor generated in the fuel vapor generating source does not pass through the activated carbon but is directly led to the admission part of engine to make the value of the air-fuel ratio remarkably small (condensed) temporarily and to exercise undesirable effects on emission and the like. Therefore, another apparatus or means is necessary for controlling this phenomenon, i.e. short cut.

According to this invention, there can be provided an adsorbent for fuel vapor having excellent advantages which has a plurality of activated carbon monolithic structures of which at least one monolithic structure is constituted of activated carbon material and these plural monothilic structures are so laminated that each vapor path therethrough follows a zigzag line, and the residence time of fuel vapor passing through the structures is prolonged by the action of said zigzag paths and thereby the fuel vapor can contact with activated carbon material sufficiently and the adsorption of fuel vapor can be made good.

EXAMPLE 2

Figure 3:
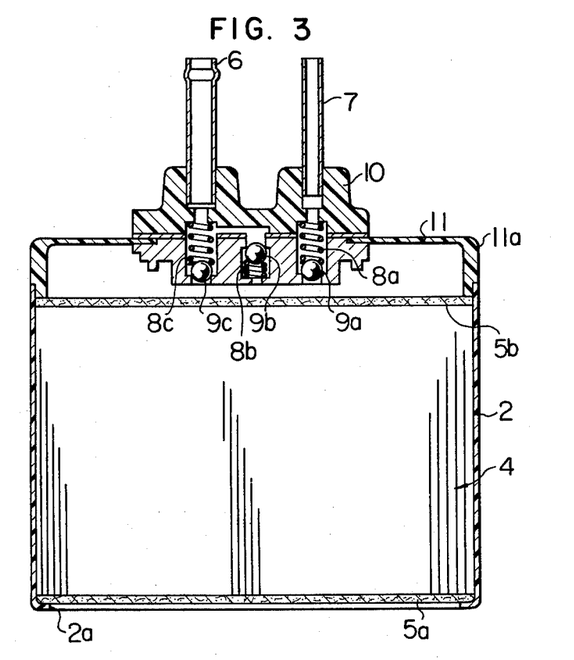
FIG. 3 is a sectional view illustrating one example of the apparatus of this invention.

In FIGS. 3 and 4, a cylindrical monolithic honeycomb activated carbon structure 4 having continuous passages between its upper and lower end surfaces is placed in a synthetic resin-made container 2 with filters 5a and 5b composed of, for example, an unwoven cloth attached onto said end surfaces. To one end of container 2 is welded a synthetic resin-made lid 11 fitted with fuel vapor inlet tube 6, mixed gas outlet tube 7, springs 8a–8c, check valves 9a–9c and base 10. On the other end of container 2 is placed the abovementioned filter 5a. Said filters 5a and 5b so act as to prevent any foreign matter contaminating desorbent air from entering the combustion chamber of the engine. Rim spacer 11a of lid 11 forms a space between the lid and container 2 and, at the same time, fixes monolithic activated carbon structure 4 tightly. Container 2 and lid 11 may optionally be made of metal. In such a case, they can be bound by rolling in the conventional manner.

The fuel vapor generated in the fuel tank passes fuel vapor inlet tube 6 and the check valve 9b and enters the space formed between container 2 and lid 11. Owing to the existence of filter 5b, the fuel vapor uniformly spreads into the space and meanwhile flows uniformly via filter 5b into monolithic activated carbon structure 4 where is adsorbed and retained. On the other hand, when the internal combustion engine is being worked while satisfying a certain condition (a condition under which the desorbed fuel vapor can enter the admission part of engine as a mixed gas together with the desorbent air), the desorbent air is led from the desorbent air feeding hole 2a at the bottom of container 2 into container 2 by the negative pressure of the engine, and then passes filter 5a and flows into monolithic activated carbon structure 4 uniformly. At this time, it desorbs the adsorbed and retained fuel vapor and regenerates the adsorbing ability of monolithic activated carbon structure 4. Thereafter, as a mixed gas, it passes filter 5b, check valve 9a, mixed gas outlet tube 7 and the suction part of engine and led into the combustion chamber where it burns.

Figure 5:
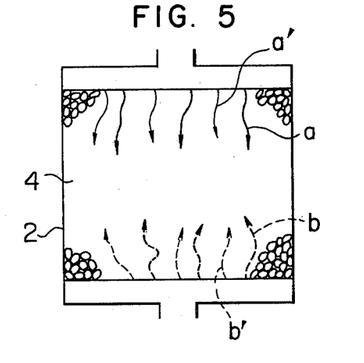
FIGS. 5 and 6 are diagrams illustrating the principle of the adsorption onto activated carbons.

Here, as the spreading of fuel vapor in the monolithic activated carbon structure 4 in the apparatus for preventing the vaporization of fuel vapor, "diffusion" and "flow" can be thought of. In the present case, however, this spreading is governed by "flow". As shown in FIG. 5, granulated activated carbon is undetermined in the granular size and individual particles contact one another partially, so that, when viewed locally, there are formed localities of high resistance to gas flow (arrow a') and localities of low resistance to gas flow (arrow a) and the flow of fuel vapor is not uniform and the flow is difficult in some parts. Regarding the flow of desorbent air, there also exist localities of difficult flow (b') and localities of easy flow (b). As the result, the granulated activated carbon is not utilized effectively.

Figure 6:
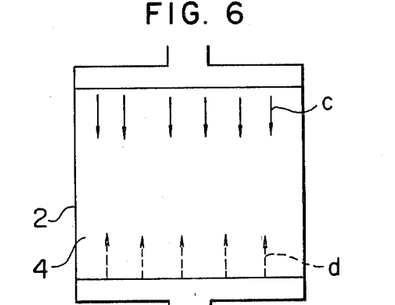

On the other hand, in the monolithic activated carbon structure of FIG. 6, the pore size is uniform and therefore the resistance to gas flow is also uniform. Accordingly, the flow of fuel vapor c and the flow of desorbent air d are uniform, and the monolithic activated carbon structure as an adsorbent is utilized effectively.

The above-mentioned phenomenon appears more pronouncedly at the time of desorbing action.

Further, in granulated activated carbon, individual particles partially contact one another as shown in FIG. 5, so that they rub together upon vibration or the like to initiate pulverization. If the pulverization once starts, the granulated activated carbon particles in the container more and more frequently rub together to promote pulverization at an increasing rate. In contrast to it, as shown in FIG. 6, monolithic activated carbon has an integral structure, so that it does not undergo pulverization like granulated carbon. Further, since monolithic activated carbon is an integrally formed product, the construction of the apparatus can be simplified and can be made into a package. Further, the pressure loss or flow resistance is small so that the adsorbing and desorbing capacity can be enhanced easily.

Figure 10:
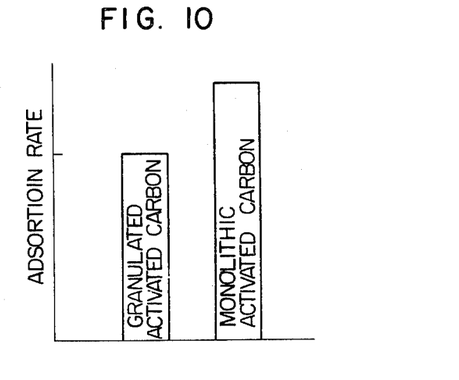
FIG. 10 is a characteristic graph used for illustrating the effect of this invention.

In FIG. 10, adsorption performance of a monolithic activated carbon structure is compared with granulated activated carbon, wherein the term "adsorption rate" means a value obtained by substracting the residual weight of adsorbed fuel vapor from the weight of adsorbed fuel vapor and dividing the difference by the weight of activated carbon. It is understandable from FIG. 10 that the monolithic activated carbon of this invention exhibits excellent performances in the ability of adsorption.

EXAMPLE 3

Figure 7:
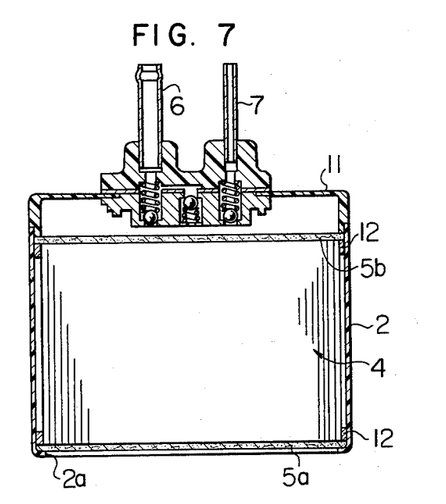
FIGS. 7-9 are sectional views illustrating other examples of the apparatus of this invention.

FIG. 7 illustrates another example of this invention. In this example, the upper and lower parts of the circumferential side wall of a cylindrical monolithic activated carbon structure 4 are tightly covered with a heat-shrinkable silicone rubber tube 12 having a certain width. The tube 12 placed between the monolithic activated carbon structure 4 and resin-made container 2 acts as a buffering material for protecting the monolithic activated carbon structure 4 against the impacts exercised externally and as a sealing material for completely preventing flow of the fuel vapor and desorbent air through the interstices between monolithic activated carbon structure 4 and the side wall of container 2.

The heat-shrinkable silicone rubber tube 12 may cover the whole surface of side wall of monolithic activated carbon 4 or cover, for example, only one circumference of the central part of the side wall. The material constituting it is not limited to above, but any materials may be used so far as they are resistant to gasoline and having a shrinkability.

EXAMPLE 4

Figure 8:
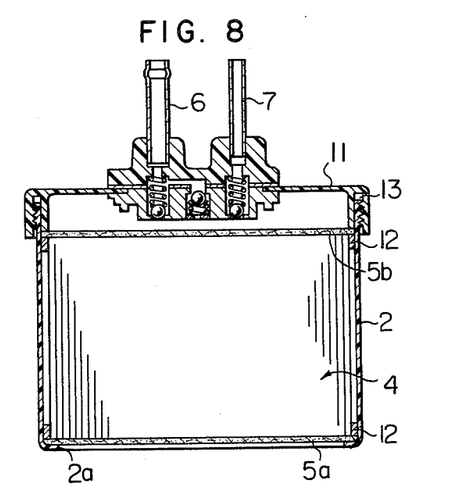

In FIG. 8 is shown an apparatus wherein lid 11 and container 2 are screwed together through the intermediation of O ring 13 to make the monolithic activated carbon structure as a replaceable adsorbent. By this, replacement of adsorbent only becomes possible, unlike the prior technique wherein the whole apparatus had to be replaced. Further, the monolithic activated carbon structure 4 as an adsorbent can be formed into a package.

EXAMPLE 5

Figure 9:
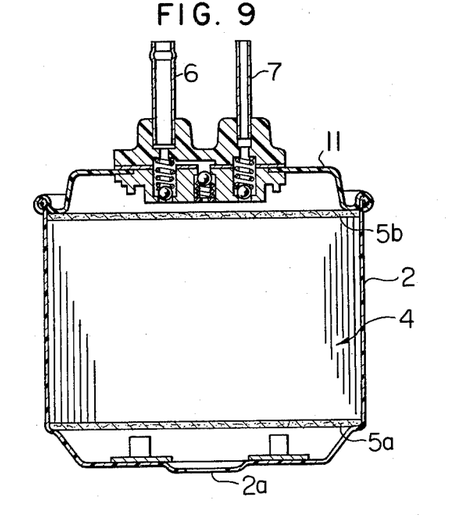

FIG. 9 illustrates another example of this invention, wherein the hitherto known container is used without any alteration. In the case of this example, plate 14 and pressing spring 15 can be omitted, as compared with the case of FIG. 2.

EXAMPLE 6

Figure 11:
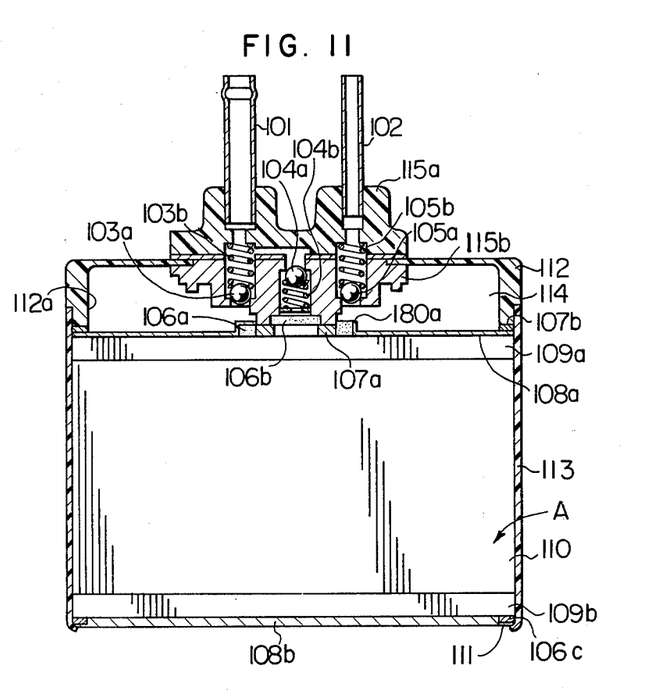
FIG. 11 is a partial sectional view illustrating one example of this invention.

In FIG. 11, 101 is a fuel vapor inlet tube communicating to the fuel tank of automobile. 102 is a mixed gas outlet tube connected to the upstream side of throttle valve of the admission pipe of internal combustion engine. 103a, 104a and 105a are check valves; 130b, 104b and 105b are springs for check valves; 106a, 106b and 106c are filters composed for unwoven cloth, foamed urethane or the like; 107a and 107b are packings made of oil-resistant rubber; 108a and 108b are metallic plates; 109a is the first monolithic structure constituted of activated carbon (upper layer part); 109b is the third monolithic structure constituted of activated carbon (lower layer part); 110 is the second monolithic structure constituted of activated carbon (medium layer part); 111 are plural holes open to the atmospheric air formed into a shape of ring with an appropriate distance to the thin-gaged part of lower plate 108b; 112 is a synthetic resin-made lid; and 113 is a synthetic resin-made container.

Figures 12, 13:
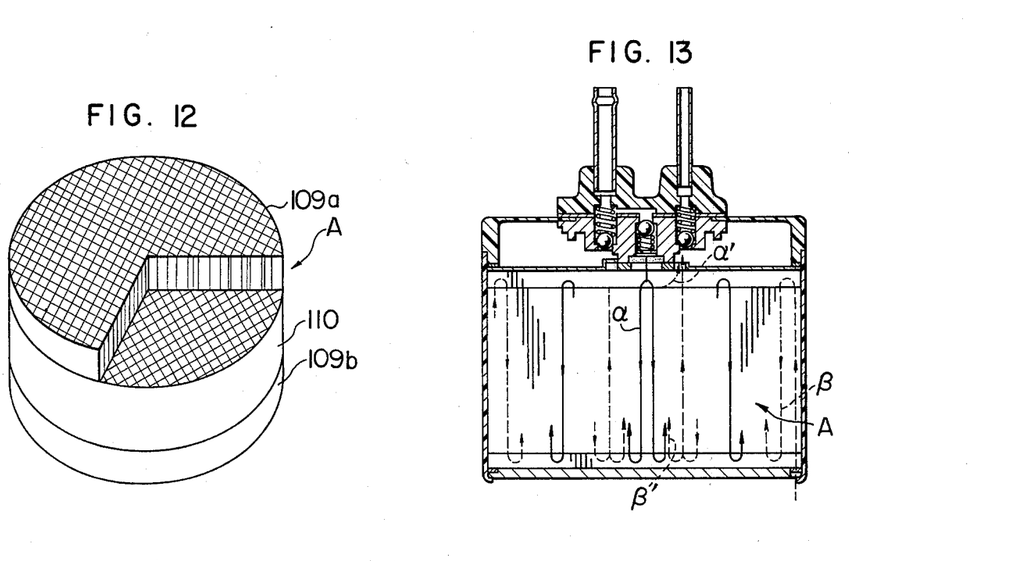
FIG. 12 is a partial sectional perspective view illustrating the laminated product used in FIG. 11.
FIG. 13 is a partial sectional view illustrating the flows of fuel vapor and desorbent air in FIG. 11.

In this example, as shown in FIGS. 12 and 13, the first monolithic structure 109a and the third monolithic structure 109b are so arranged that their through passage groups completely coincide, and the second monolithic structure 110 is so arranged that its passage groups make an angle of about 45° with those of the first and the third monolithic structures 109a and 109b. The two ends of laminated product A composed of these first, second and third monolithic structures 109a, 110 and 109b, i.e. the ends of the first and the third monlithic structures 109a and 109b are closed with the above-mentioned plates 108a and 108b so as to give no gap. The laminate A is placed in a synthetic resin-made container 113, and the container 113 is fitted with a lid 112 having fuel vapor inlet tube 101, fitting bases 115a and 115b, etc. by welding. At the center of said plate 108a is a hole 180a for opening the central part of the first monolithic structure 109a, which forms an inlet or outlet of fuel vapor and mixed gas (desorbent and fuel vapor) into laminated product A. Further, plate 108a simultaneously acts so as to fix filter 106a. The other plate 108b has many holes open to the atmospheric air at the position of filter 106c as has been mentioned above, by which the peripheral part of the third monolithic structure 109b is opened and therefrom the desorbent air enters inside the laminated product A. Further plate 108b simultaneously fixes filter 106c and supports the laminated product A. Packing 107a serves as a practical inlet for the fuel vapor into laminated product A and, at the same time, prevents that the fuel vapor flows into filter 106a and causes short cut. Filters 106a and 106c are for preventing any foreign matter contaminating the desorbent air from entering the laminated product A and further the inside of combustion chamber of the engine. 107b perfectly prevents that the desorbent air flows away through the interstices formed between the peripheral part of plate 108a and side wall of container 113. Spacer 112a provided on lid 112 forms a space 114 and, at the same time, tightly fixes the laminated product A and the other structures accompanying thereto in co-operation with container 113.

In the above-mentioned construction, the fuel vapor generated in fuel tank or the like passes fuel vapor inlet tube 101, check valve 104a and filter 106b and flows into the first, second and third monolithic structures 109a, 110 and 109b of laminated product A. Since passages extending nearly concentric circularly are formed in the monolithic structures 109a, 110 and 109b as will be mentioned later, the fuel vapor is adsorbed and retained on the activated carbon part while flowing along these passages.

On the other hand, when the internal combustion engine is being worked while satisfying a certain condition, i.e. a condition under which the desorbed fuel vapor may enter the admission part of engine as a mixed gas together with the desorbent air, the desorbent air taken from the hole 111 opened to the atmospheric air passes filter 106c and enters laminated product A by the negative pressure of the engine. If flows counter-current-wise to the fuel vapor, during which it desorbs the fuel vapor adsorbed and retained in the monolithic structures 109a, 110 and 109b to form a mixed gas, which passes filter 106a, check valve 105a, mixed gas outlet tube 102 and the admission part of engine and is led into combustion chamber where it burns.

Next, the flows of fuel vapor and desorbent air are shown in FIG. 13, wherein solid line α represents the main flow of fuel vapor and dash line α' represents a slight flow. The flow of α' can be controlled by regulating the resistance to gas flow in the downstream side (outer direction of laminated product A) than filter 106a in FIG. 2 and gas permeability of filter 106d. When the resistance of filter 106a, to gas flow, is greater than the other resistance, the flow of α' does not appear. If the resistance of filter 106a to gas flow is smaller than the other, there appears the flow of α', but the fuel vapor flows into space 114, is retained there without leaking to exterior and is burnt together with the mixed gas in the combustion chamber of the engine at the time of running the engine. Broken line β is the main flow of desorbent air, and dash line β' is a slight flow. The region of β' (the inside region of filter 106a) is less important with regard to desorbing action, but it is the central region of the adsorbent and its volume is only slight as compared with the total volume of the adsorbent. As will be mentioned later, this region rather plays an important role in preventing short cut.

As is understandable from FIG. 13, fuel vapor always passes the passage group comprising the first, second and third monolithic structures 109a, 110 and 109b, so that it passes through the first, second and thrid monolithic structures 109a, 110 and 109b and filter 106a and is mixed with the mixed gas in space 114 even when desorbent air is flowing at the time of running the engine. As above, the fuel vapor by no means enters check valve 105a (leading to the suction part of engine) in a short-circuit manner, so that the phenomenon of short cut can be prevented.

Figure 14A:
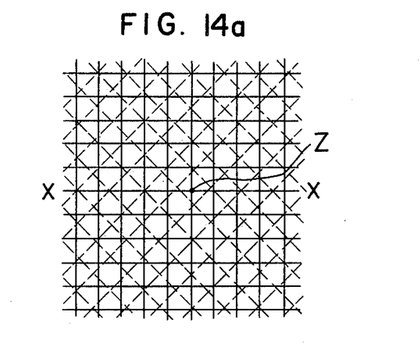
Figure 14B:
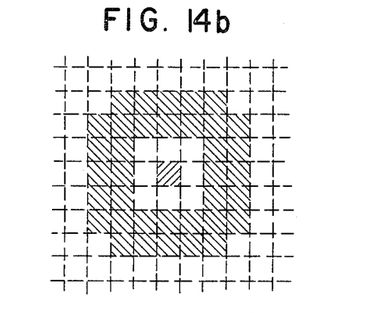
FIG. 14b is a plan view illustrating the first monolithic structure and the range of adsorption of fuel vapor thereonto.
Figure 14C:
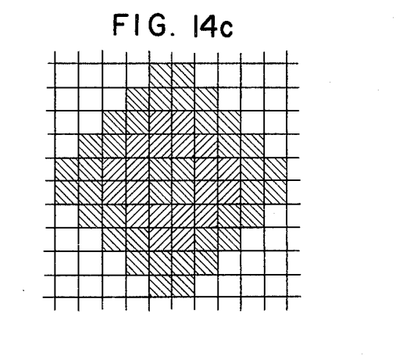
FIG. 14c is a plan view illustrating the second monolithic structure and the range of adsorption of fuel vapor thereonto.

Next, the flows of fuel vapor or desorbent air in the construction constituting the essentiality of this invention will be mentioned. In FIGS. 14a to 14d and 15, FIG. 14a is a plan view of laminated product A; FIG. 14b illustrates the first monolithic structure 109a; FIG.

Figure 14D:
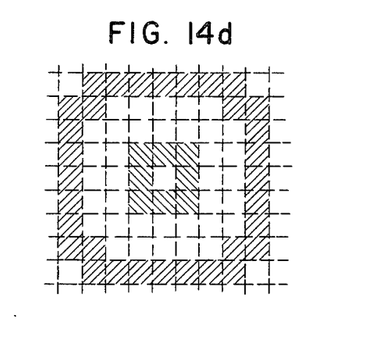
FIG. 14d is a plan view illustrating the third monolithic structure and the range of adsorption of fuel vapor thereonto.
Figure 15:
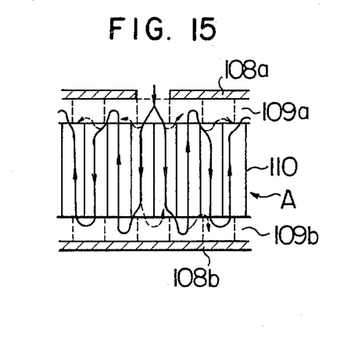
FIG. 15 is a sectional view illustrating in detail the flows of fuel vapor across the monolithic structures of FIGS. 14a to 14d.

14c illustrates the second monolithic structure 110; and FIG. 14d illustrates the third monolithic structure 109b. If a fuel vapor flows in from center Z, it spreads out in concentric circles as shown by cross-hatching in FIG. 14a to 14d and, at the same time, flows while changing its direction of flow towards up and down as shown in FIG. 15 (X—X sectional view of FIG. 14a). Here the broken line of FIG. 15 is the flow in the short-circuit case, and an experiment has revealed that such a short-circuit flow has no important influence on performance though it appears to be slight. In the case of desorbent air, the flow occurs in the reverse direction.

EXAMPLE 7

Figure 16A:
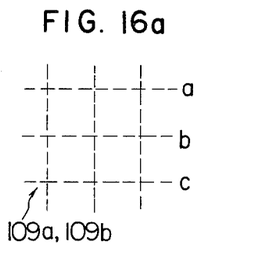
FIG. 16a is a diagrammatic plan view illustrating the first and third monolithic structures.
Figure 16B:
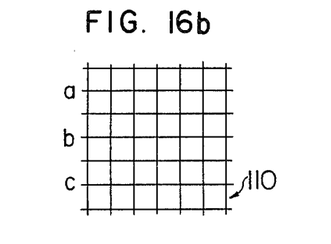
FIG. 16b is a diagrammatic plan view illustrating the second monolithic structure.

FIGS. 16a to 16c illustrate another example of this invention. In this example, the sizes of individual passages of the passage group in the first monolithic structure 109a and the third monolithic structure 109b are made 4 times as great as the size of the passages in the second monolithic structure 110, and lamination is carried out in such a manner that the pitch of the passage group of the first monolithic structure 109a is one pitch shifted from the pitch of the passage group of the third monolithic structure 109b and, when four passages of the second monolithic structure 110 are counted as one unit of passage part, the pitch of this one unit of passage part coincides with the pitch of the passage group of the first monolithic structure 109a. That is to say, in FIGS. 16a and 16b, the walls a, b and c are superposed on one another.

Figure 16C:
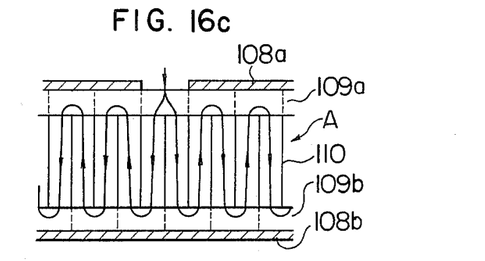
FIG. 16c is a sectional view illustrating the laminated product formed by laminating the first, second and third monolithic structures and the flow of fuel vapor across it.
Figure 17A:
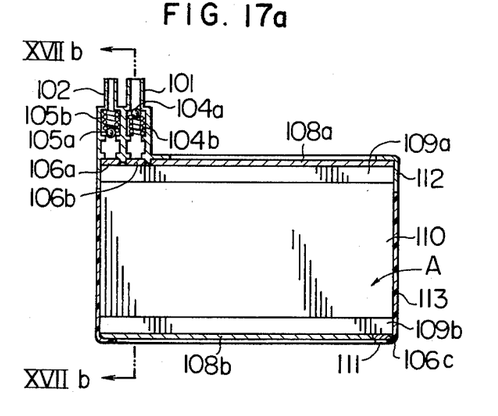
Figure 17B:
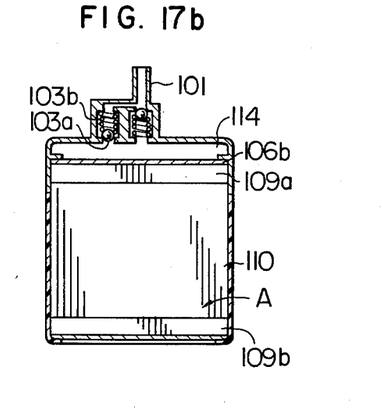

According to the above-mentioned example, the fuel vapor flows through the respective passage groups of the first, second and third monolithic structures 109a, 110 and 109b as shown in FIG. 16c, and the short-circuit flow of fuel vapor disappears.

In FIGS. 17a and 17b and FIGS. 18a, 18b, 18c, 18d, the first, second and third monolithic structures 109a, 110 and 109b are shaped into a quadrilateral body. A fuel vapor inlet tube 101 and a mixed gas outlet tube 102 are provided on the rectangular part of the upper part of laminated product A composed of these monolithic structures. Many holes open to the atmospheric air 111 are provided so as to give a shape of ring at appropriate intervals on the lower part of the container. The size of plate 108a is so designed as to open the regions of laminated product A confronting the inlet tube 101 and the outlet tube 102. A linear continuous hole open to the atmospheric air 111 is provided on the other plate 108b though it is only at one position, and a part of the third monolithic structure 109b is opened.

Figure 18A:
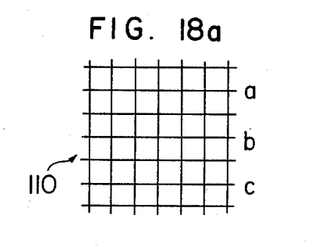
FIG. 18a is a diagrammatic plan view illustrating the second monolithic structure.
Figure 18B:
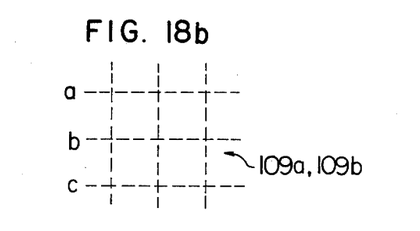
FIG. 18b is a diagrammatic plan view illustrating the first and third monolithic structures.
Figure 18C:
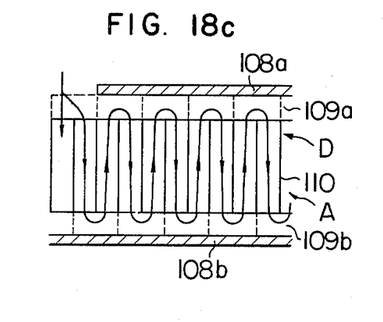
FIG. 18c is a sectional view illustrating the laminated product formed by laminating the first, second and third monolithic structures and the flow of fuel vapor across it.
Figure 18D:
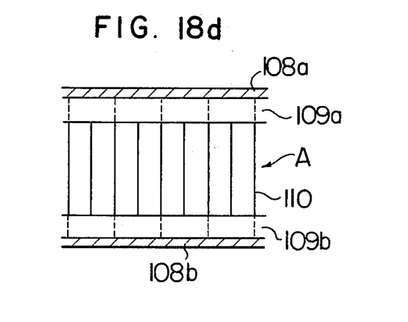
FIG. 18d is a view shown from the direction indicated as D of FIG. 18c.

In this example, the sizes of the passages of the first, second and third monolithic structures 109a, 110 and 109b and the state of lamination of this structure are as shown in FIGS. 18a, 18b, 18c and 18d. That is to say, the state corresponds to a state in which the walls a, b and c in FIGS. 18a and 18b are mutually superposed.

Figure 19:
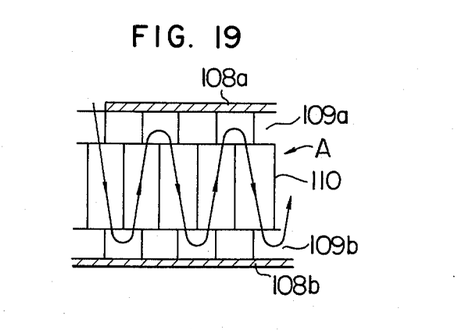
FIG. 19 is a sectional view illustrating the laminated product and the flow of fuel vapor in yet another example of this invention, and a partial perspective sectional view illustrating activated carbon.

FIG. 19 illustrates yet another example of this invention, wherein the sizes and numbers of the first, second and third monolithic structures 109a, 110 and 109b are equalized, the first and third monolithic structures 109a and 109b are laminated so that their passage groups have the same pitch and the second monolithic structure 110 is so laminated as to shift by one pitch from the first and third monolithic structures 109a and 109b.

According to this example, the fuel vapor flows as shown by the arrow and, in the passages of the second monolithic structure 110, flows through every passage. In the first and third monolithic structures 109a and 109b, it flows through every other passage.

EXAMPLE 8

Figure 20:
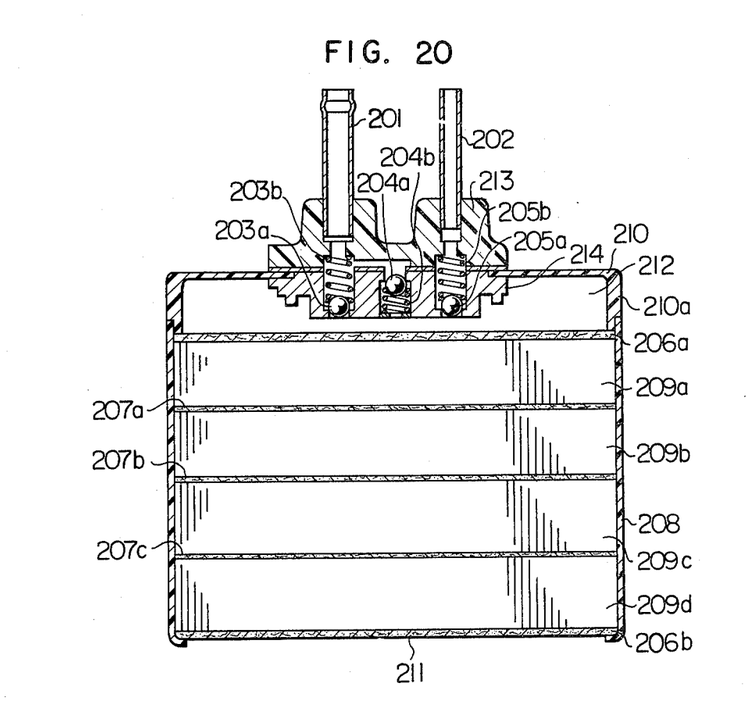
FIG. 20 is a partial sectional view illustrating one example of this invention.
Figure 21:
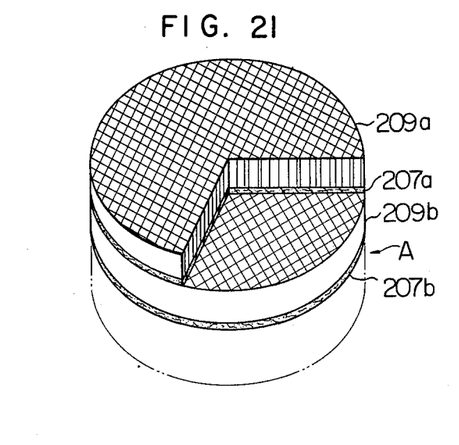
FIG. 21 is a partial sectional perspective view illustrating the laminated product of FIG. 20.

In FIGS. 20 and 21, 201 is fuel vapor inlet tube communicating to fuel tank; 202 is mixed gas outlet tube communicating to the upstream of throttle valve of admission pipe of internal combustion engine; 203a, 204a and 205a are check valves; 203b, 204b and 205b are springs for check valves; 206a and 206b are air-permeable filters composed of a material resistant to the deterioration caused by fuel such as unwoven cloth; 207a, 207b and 207c are air-permeable filters composed of the same material as above; 208 is container; 209a, 209b, 209c and 209d are activated carbons having monolithic structure wherein many passages are isolated by walls; 210 is lid with spacer 210a; 211 is a hole open to the atmospheric air; and 212 is a space.

The activated carbons 209a–209d have the same number of passages of the same shape and size and are superposed so that their passages communicate mutually, but the directions of the arrangement of the passages (the directions viewed from the horizontal plane) are different from one another. To the two end surfaces of the laminated product A are attached with said filters 206a and 206b and the whole is placed in a synthetic resin-made container 208. A synthetic resin-made lid 210 equipped with fuel vapor inlet tube 201 and bases 213 and 214 is fixed on container 208 by welding. Filters 206a and 206b so act as to prevent any foreign matter contaminating the desorbent air from entering into laminated product A and further into the combustion chamber of the engine. Spacer 210a attached to lid 210 forms a space 212 and, at the same time, tightly fixes laminated product A in co-operation with container 208. Filters 207a–207c so act as to temporarily disturb the flow passing the activated carbons 209a–209d and, at the same time, play the same role as filters 206a and 206b. Further, by making different the directions of the arrangement of passages in activated carbons 209a–209d, the flow in laminated product A is more disturbed.

In the above-mentioned construction, the fuel vapor generated in fuel tank passes fuel vapor inlet tube 201 and check valve 204a, and flows into space 212. Here, owing to the existence of filter 206a, it uniformly spreads in space 212, and meanwhile passes filter 206a, flows into activated carbons 209a–209d and is adsorbed and retained thereon.

On the other hand, when the engine is being run while satisfying a certain condition, i.e. a condition under which the desorbed fuel vapor may enter the suction part of the engine together with desorbent air as a mixed gas, the desorbent air is introduced from the desorbent air supplying hole 211 by the negative pressure of the engine, passes filter 206b and flows into activated carbons 209d–209a. Upon this time, it desorbs the adsorbed and retained fuel vapor and regenerates the adsorbing ability of activated carbons 209a–209d, after which it passes filter 206a as a mixed gas, passes check valve 205a, mixed gas outlet tube 202 and suction part of the engine and enters the combustion chamber where it burns.

With regard to the spreading of fuel vapor in activated carbons 209a–209d, there can be thought of "diffusion" and "flow". In the present case, however, the spreading is governed by "flow". Therefore, if the above-mentioned monolithic activated carbon is used alone, the "flow" tends to shift to the laminar flow region because of the structure of the activated carbon. Further, since the flow rates of fuel vapor and desorbent air are low, the shift of "flow" to the laminar flow region is more promoted. According to a calculation, the flow is estimated to be a laminar flow having a Re number of several tens to several hundreds. Although the value of Re number varies depending on the diameter of passage in activated carbon, it was found to be in this range, roughly speaking.

Figure 22:
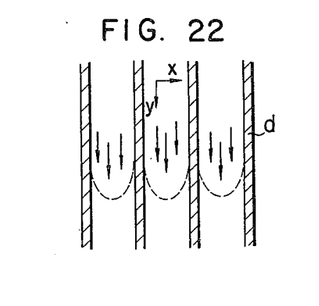
FIGS. 22 and 23 are sectional views illustrating the state of flow of fuel vapor in the passage of the activated carbon having monolithic structure which explain the action of this invention.

For the above-mentioned reason, as shown in FIG. 22, the "flow" in the monolithic activated carbon structure viewed microscopically runs mainly towards the y direction parallel to the wall and the proportion of the flow of X direction or the flow running towards the wall α which is effective for the adsorption and desorption is small, so that the phenomenon of "flow through" appears markedly.

In this invention, the "flow" is temporarily disturbed so that it does not flow through the monolithic activated carbon as it is in the state of laminar flow, with the aim of improving the adsorbing and desorbing actions. This will be explained by way of FIG. 23 which shows a partially enlarged section of the laminated product A of FIG. 21. If flow vapor is taken as an example, the fuel vapor having passed filter 206a flows into the passage of activated carbon 209a, after which it gradually shifts to a "laminar flow". However, because filter 207a exists there and the arrangement of the passages of activated carbons 209a and 209b is irregular, the flow is disturbed in this region to increase the flow of X direction effective for adsorption and, as the result, the adsorbing action is improved. While repeating the above-mentioned movement, the fuel vapor is adsorbed and retained. When desorbent air flows, there still takes place the same phenomenon as above, by which the adsorbed and retained fuel vapor is desorbed.

EXAMPLE 9

FIG. 24 illustrates another example of this invention, wherein the shapes, sizes and numbers of the passages of plural activated carbons 209a, 209b, . . . are all designed so as to become equal, the plural activated carbons are laminated so that the direction of arrangement of their passages become identical mutually, and air-permeable filters 207a, 207b, . . . are between the layers laminated. According to this example, a disturbance is caused by the filters 207a, 207b, . . . in the flow in the passages of activated carbons.

EXAMPLE 10

FIG. 25 illustrates another example of this invention, wherein the sizes of passages of the plural activated carbons 209a, 209b, . . . are made different from one another and the directions of arrangement of the passages are also made different mutually. According to this invention, there arises a disturbance in the flow in the passages due to the different size and direction of arrangement of the passages.

EXAMPLE 11

Figure 28:
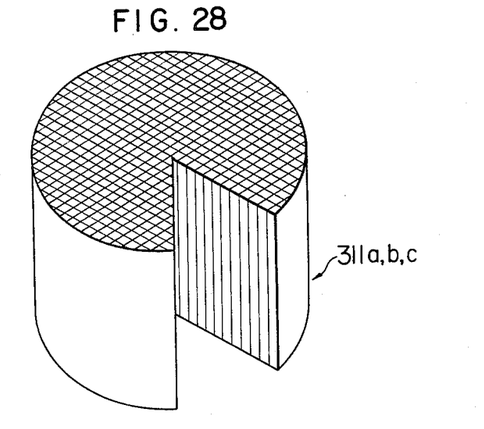
FIG. 28 is a partial sectional perspective view illustrating the monolithic structure used in the apparatus shown in FIG. 27.

In FIGS. 27 and 28, 301 is a fuel vapor inlet tube communicating to the fuel tank or the float chamber of carbureter; and 302 is a mixed gas outlet tube communicating to the upstream side of the throttle valve of admission pipe of the internal combustion engine. These tubes 301 and 302 are fixed on one base 303. On the other base 306 are placed check valves 304a–304c and springs 305a–305c. 307 is container made of a resin resistant to the deterioration caused by fuel having two ends open, one of which is a hole open to the atmospheric air 308. To the part of this hole 308 open to the atmospheric air is attached a plate 309 having many small holes 309a covered by a filter 312e. 310a–310c are layers of granulated activated carbon constructed of very many grains of granulated activated carbon. 311a and 311b are monolithic structures constructed of activated carbon material and having a cylindrical form, wherein many passagges are isolated by walls as shown in FIG. 28. The granulated activated carbon layers 310a–310c and the monolithic structures 311a–311c are alternatively laminated through intermediation of filters 312a–312d. 313a–313c are ringformed screen plates made of, for example, a material resistant to the deterioration caused by fuel. These screen plates 313a–313c are independently placed in the respective granulated activated carbon layers 310a–310c. Among them, screen plates 313a and 313c divide the granulated activated carbon layers 310a and 310c into two concentric sections, while screen plate 313b having an H-formed longitudinal section divides granulated activated carbon layer 310b into three sections. 314 is a plate having a hole 314a at its center and is attached to the upmost granulated activated carbon layer 310c. Through the hole 314a of this plate 314, the pipe 306a of the base 306 is inserted into the inside of said granulated activated carbon layer 310c. 315 and 316 are filters; 317 is a fixing ring for filter 315; and 318 is a spring. 319 is a lid made of a resin resistant to the deterioration caused by fuel which is fixed on the above-mentioned container 307 by welding through intermediation of gasket 320. 321 is a space; and 322 is a ring-formed packing made of a rubber resistant to the deterioration caused by fuel which is placed between pipe 306a of base 306 and filter 312d.

Figure 29:
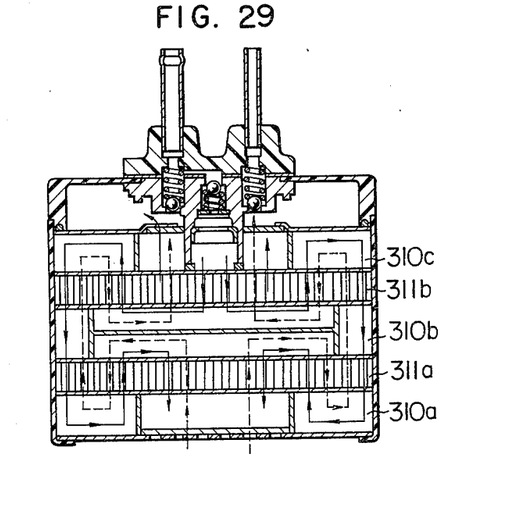
FIG. 29 is a sectional view illustrating the flow of fuel in the apparatus shown in FIG. 27.
Figure 30:
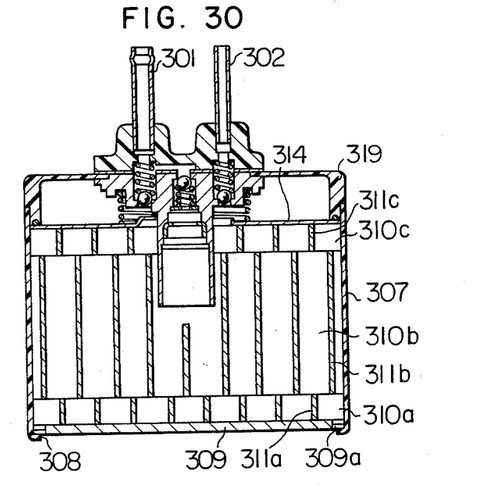
FIG. 30 is a sectional view illustrating another example of the apparatus of this invention.
Figure 31:
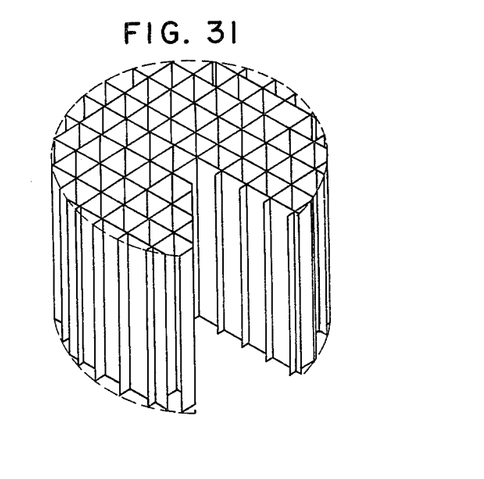
FIG. 31 is a partial sectional perspective view illustrating the monolithic structure used in the apparatus shown in FIG. 30.
Figure 32:
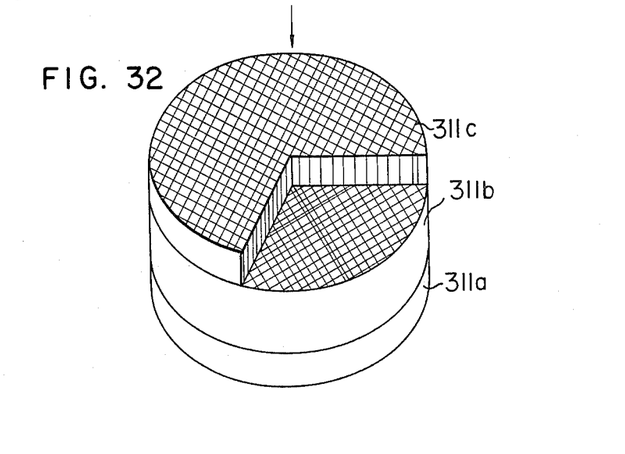
FIG. 32 is a partial sectional perspective view illustrating the state of lamination of the monolithic structure shown in FIG. 31.

Next, the working in the above-mentioned construction will be explained. In this example, each of the three granulated activated carbon layers 310a–310c is divided into a plurality of sections by the screen plates 313a–313c, and the divided parts are mutually isolated by the screen plates and do not communicate. Furthermore, monolithic structures 311a and 311b having many passages are placed at the ends of the granulated activated carbon layers 310a–310c. Accordingly, the fuel vapor having passed inlet tube 301, check valve 305a, *filter 315 and pipe 306a* passes through monolithic structures 311a and 311b and granulated activated carbon layers 310a–310c in a zigzag way as indicated by the solid arrows of FIG. 29. Accordingly, nearly the whole region of the granulated activated carbon layers 310a–310c can be effectively utilized for the adsorption of fuel vapor, and the monolithic structures 311a and 311b themselves can also be utilized for the adsorption of fuel vapor. The desorbent air flows as indicated by the dotted arrows in FIG. 29.

EXAMPLE 12

FIGS. 30 to 33a, 33b illustrate another example of this invention. In this example, three monolithic structures 311a–311c (constituted of an activated carbon material) are used. The passage groups of the upper monolithic structure 311c are made to coincide with those of the lower monolithic structure 311a. Regarding the intermediate monolithic structure 311b, its passage groups are so arranged as to make an angle of about 45° with those of the upper and lower structures. Owing to this laminated structure, the paths passing the individual passage groups of the three monolithic structures 311a–311c have a zigzag form. And, granulated activated carbon layers 310a–310c are arranged on the individual passages of these monolithic structures 311a–311c. The upmost monolithic structure 311c is fitted with a plate 314 having an open hole 314a at its center, while the lowest monolithic structure 311a is fitted with a plate 309 having many small holes 309a on its outer circumference.

Figure 33A:
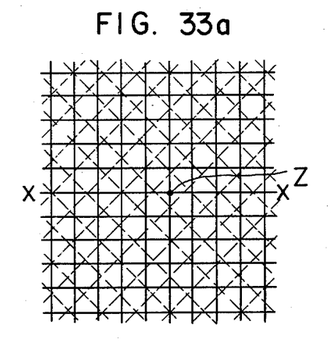
FIG. 33a is a view shown from the direction indicated as A of FIG. 32.
Figure 33B:
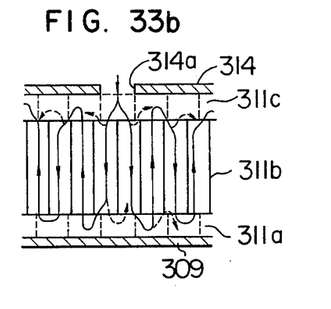

The flow of fuel vapor in another example having the above-mentioned construction will be explained with reference to FIGS. 33a and 33b. The fuel vapor flowing into from the Z position of FIG. 33a tends to flow downwards directly. However, since the ends of monolithic structures 311a and 311c are stopped by plates 309 and 314, the fuel vapor changes its direction of flow to upside and ultimately it flows as shown in FIG. 33b which is an x—x sectional view of FIG. 33a. Since such a flow is not limited to the x—x direction but also similarly takes place in other radial directions, the fuel vapor tends to flow and spread in a nearly concentric form. During this movement, the fuel vapor is adsorbed and retained. Here, it may be thought that the short circuit flow indicated by the broken line of FIG. 33b can also take place. According to the result of an experiment, however, such a short circuit flow was found to have no considerable influence on performances even though it occurs to a slight extent.

Figure 34A:
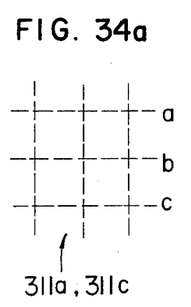
FIGS. 34a and 34b are diagrammatic plan views illustrating the monolithic structures used therein and FIG. 34c is a sectional view illustrating the flow of fuel vapor.
Figure 34B:
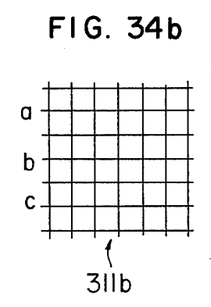
Figure 34C:
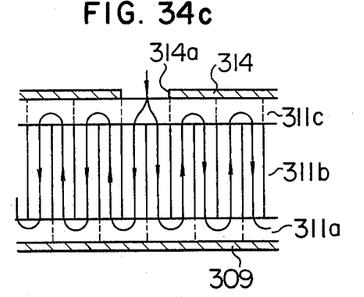

FIGS. 34a to 34c illustrate yet another example of this invention, wherein the passage per each one of the monolithic structures 311a and 311c is made to have 4 times as great a size as that of monolithic structure 311b and the walls a, b and c in FIG. 34a and 34b are mutually overlapped. In this example, the short circuit flow of fuel vapor as shown in FIG. 33b is eliminated though the three monolithic structures 311a–311c become identical in the direction of passage.

The effects of this invention explained above are summarized as follows:

(1) Since an integrally formed activated carbon having a monolithic structure having many communicating holes is used as adsorbent, mutual rubbing caused by vibration or the like does not occur and therefore pulverization does not occur, unlike the case of packing granulated activated carbons.

(2) Since pulverization of adsorbent does not occur, the increase in the resistance to gas flow caused by, for example, clogging of filter does not occur in the apparatus for adsorbing fuel vapor, so that the apparatus is excellent in resistance to vibration.

(3) Since the adsorbent has a monolithic structure, the fuel vapor and the desorbent air flow uniformly over the whole region of adsorbent, so that the whole region of the adsorbent can be utilized effectively.

(4) Since the whole region of the adsorbent can be utilized effectively, the apparatus can be made small-sized relatively.

(5) Because of the integral structure, there is needed no mechanism for pre-pressing or supporting the adsorbent as compared with the case of hitherto known apparatuses, so that the construction of the apparatus can be made simpler relatively and the number of man-hours for fitting and the weight can be reduced. Further, packaging becomes possible and it becomes easier to exchange only adsorbent, if it is necessary.

(6) The resistance to gas flow is lower than in the case of granulated activated carbon, so that the capacity can easily be increased.

As has been detailed above, in this invention, a plurality of monolithic structures are provided, of which at least one monolithic structure is constructed of activated carbon material. Further, these plural monolithic structures are so laminated that the paths passing their respective passage groups become zigzag-formed, and plates for closing the ends are attached to the two ends of the laminated product, and holes are provided on the side of the plates or on the plates themselves to partially open the two ends of the laminated product, and one of the open holes is used as a fuel vapor inlet and the other is used as a desorbent air outlet. Thus, by the action of the zigzag-formed paths formed by the passages groups of the plural monolithic structures, the residence time of the fuel vapor passing said paths is prolonged, and the fuel vapor passing the passage groups of the one monolithic structure constituted of activated carbon material is sufficiently adsorbed on the activated carbon material of the passage group, and accordingly the adsorption of fuel vapor can be enhanced remarkably.

Further, since the desorbent air also passes the above-mentioned zigzag-formed paths, it surely desorbs the once adsorbed fuel vapor and makes possible to recover the adsorbing ability.

Further, since the fuel vapor can surely be introduced into the passage groups of the monolithic structures constituted of activated carbon material as above, there arises no problem of short cut, i.e. the phenomenon that the fuel vapor does not enter the passage groups but enter via a short circuit into other outlets for discharging the desorbent air.

This invention is not limited to the abovementioned examples, but can be modified in various manners as follows:

(1) It is of course allowable that only the second monolithic structure 110 corresponding to the medium layer among the laminated layers of A is constructed of an activated carbon material and the other first and third monolithic structures 109a and 109b are constructed of a material other than activated carbon such as resinous material, porcelain and the like.

(2) Aside from (1), it is also allowable to construct only the first monolithic structure 109a or only the third monolithic structure 109b from an activated carbon material and the other monolithic structures from the other material mentioned in (1). In this case, it is recommendable to increase the height and dimension (in the direction to which the passage group extends) of the first and third monolithic structures 109a and 109b positioned at the both ends of laminated product A. It is also allowable to decrease the height and dimension of the intermediate second monolithic structure 110.

(3) The number of passages and their cross-sectional shape (triangular, round or the like) of the first, second and third monolithic structures 109a, 110 and 109b may be arbitrary. The mode of lamination of the first, second and third monolithic structures 109a, 110 and 109b may be arbitrary, so far as a path zigzag passing these passage groups can be formed.

Figure 23:
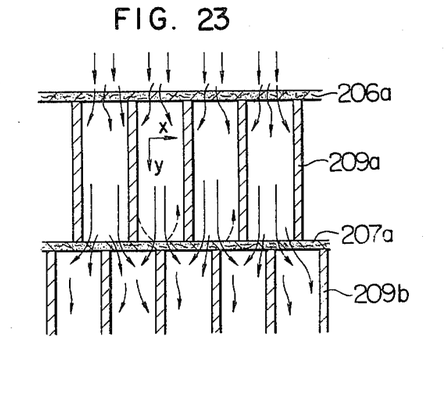

(4) The apparatus of FIG. 23 is so constructed that the passages of the plural activated carbons 209a and 209b shift each other by one pitch. In such a construction, a disturbance can be made to occur in the flows of fuel vapor and desorbent air, even if filters 206a and 207a are absent.

(5) It is also allowable that the passages of the plural activated carbons are constructed so as to have different sizes from one another and the activated carbons are so laminated that the sizes of their passages alternately change in the manner of large-small-large-small towards the direction of lamination of activated carbons and thereby disturbances are made to occur in the flow at the centers of respective passages as co-centers.

(6) Though the monolithic structures 311a–311c of Example 11 are both constructed of an activated carbon material, they may also be constructed of, for example, a metallic material, a porcelain or a resinous material resistant to the deterioration caused by fuel, of course.

(7) The shape of the cross-section of the passage of monolithic structures 311a–311c is not limited to quadrilateral but it may also be triangular, round or the like.

(8) In Example 11 of FIG. 27, the shape of screen plates 313a–313c may be arbitrary, by which the mode of the flow of fuel vapor can be changed in various manners.

(9) In Example 11 of FIG. 27, the numbers of the monolithic structures and the granulated activated carbon layers may be selected arbitrarily.

(10) In Example 12 of FIG. 34, the sizes of passages of the plural monolithic structures may be altered arbitrarily.

What is claimed is:

1. An apparatus for adsorbing fuel vapor comprising a container; a fuel vapor inlet for introducing the fuel vapor into the container; a gas outlet for taking the air-fuel mixture out from the container; an air inlet for introducing desorbing air into the container; and an adsorbent, being set in the container, for adsorbing the fuel vapor, said adsorbent including first, second and third monolithic structures each having many through passages separated by walls, at least one of said structures being constructed of integrally formed activated charcoal, said structures being so laminated together that the vapor/gas path through the three passage groups provided by said first, second and third structures are of zigzag configuration, the two opposite ends of the laminated product being fitted with plates for closing said ends with said ends being partially open by so designing the shape of said plates or providing said plates with holes, one of said partially open ends comprising a fuel vapor inlet and the other a desorbent air inlet, and said two partially open ends being arranged at positions not mutually confronting.

2. An apparatus according to claim 1, wherein the passage groups of the first and third monolithic structures placed at two ends of the laminated product have the same pitch and the pitch of the passage group of the second monolithic structure placed at the middle of the laminated product shifts by one pitch from the pitches of the first and third monolithic structures.

3. An apparatus according to claim 1, wherein the individual passages of the passage groups of the first and third monolithic structures placed at the two ends of the laminated product have 4 times as great a size as the individual passages of the second monolithic structure placed at the intermediate position of the laminated product, and the pitches of the passage groups of the first and third monolithic structures shift by one pitch from each other, and when four passages in the above-mentioned passage group of the second monolithic structure are referred to as one unit, the pitch of this one unit of passages is made equal to the pitch of the passage group of the first monolithic structure or the third monolithic structure.

4. An apparatus according to claims 1, 2 or 3, wherein the second monolithic structure placed at the intermediate position of the laminated product is constructed of said activated carbon material.

5. An apparatus according to claim 4, wherein the height and dimension of the second monolithic structure along the direction in which said passage group extends are greater than the heights and dimensions of the first and third monolithic structures.

6. An apparatus according to claim 5, wherein the first and third monolithic structures are constructed of a material other than activated carbon such as a resin resistant to the deterioration caused by fuel, porcelain or the like.

7. An apparatus according to claim 5, wherein the first and third monolithic structures are also constructed of an activated carbon material.

8. An apparatus for adsorbing fuel vapor comprising: a container, a fuel vapor inlet for introducing the fuel vapor into the container; a gas outlet for taking the air-fuel mixture out from the container; an air inlet for introducing desorbing air into the container; and an adsorbent being set in the container, for adsorbing the fuel vapor, said adsorbent comprising a plurality of integrally formed activated charcoal monolithic honeycomb structures each provided with many through passages separated by walls, said structures being laminated in series so that their passages mutually communicate, the passage groups of said structures having pitches different from one another so as to form a disturbance in the flow of fuel vapor passing through the laminated product.

9. An apparatus for adsorbing fuel vapor comprising: a container, a fuel vapor inlet for introducing the fuel vapor into the container; a gas outlet for taking the air-fuel mixture out from the container; an air inlet for introducing desorbing air into the container; and an absorbent being set in the container, for adsorbing the fuel vapor, said adsorbent comprising a plurality of integrally formed activated charcoal monolithic structures each provided with many through passages separated by walls, and layers of granulated activated carbon for adsorbing fuel vapor, said passages and layers being so combined that the vapor/gas path through the passage groups in the structures and through said carbon layers is of zigzag configuration.

10. An apparatus according to claim 9 wherein said plural monolithic structures are constructed of a material selected from the group consisting of activated carbon for adsorbing fuel vapor, resin resistant to the deterioration caused by fuel vapor, porcelain and metal.

* * * * *